Patented June 11, 1935

2,004,880

UNITED STATES PATENT OFFICE 2,004,880

MIXED ESTER RESIN

Israel Rosenblum, Jackson Heights, N. Y.

No Drawing. Application December 14, 1933,
Serial No. 702,366

6 Claims. (Cl. 260—8)

The present invention relates to the production of homogeneous, plastic and semi-plastic resins suitable for use in the manufacture of coating compositions of various kinds and produced by the condensation of a polyhydric alcohol with phthalic acid, maleic acid and one or more acids obtainable by the hydrolysis of fatty oils and fats, in such proportions and under such conditions that fusible, oil soluble, resinous mixed esters of the polyhydric alcohol are obtained which are practically neutral.

I have found that maleic acid exerts a very beneficial influence upon resins containing the same in chemical combination, and that, in particular, plastic resins containing such acid are characterized by a better retention of color, a lighter color, more rapid reaction (my improved resin can be produced in about one-fourth the time usually required for the alkyd type of resin), greater durability and a higher degree of waterproofness than known resins of the polyhydric alcohol-polybasic acid type, and are capable of producing white air-drying and baking enamels when brought into solution and in conjunction with white pigments.

In the attempt to ascertain under what conditions and in what amounts maleic acid can be condensed, along with other acids, with a polyhydric alcohol to produce useful, homogeneous, oil-soluble commercial resins suitable for the manufacture of coating compositions and characterized by an extremely light or pale color and by the production of films of a high degree of toughness, durability and adhesion, investigations were conducted by me in which glycerol, maleic acid and one or more other organic acids, including fatty oil or fat acids, were condensed under various proportions and conditions. I was aware that the prior art suggested the condensation of glycerol, a fatty oil acid (such as oleic or linoleic acid) and phthalic acid, and suggested that the latter acid could be replaced with a dibasic aliphatic acid, such as maleic, malic, tartaric, succinic, etc. My investigations have, however, established that no commercially useful resin suitable for the manufacture of coating compositions can be obtained by replacing the phthalic acid with a dibasic aliphatic acid, and that even when the phthalic acid is replaced only in part with, for example, maleic acid, certain proportions, within rather definite limits, between the various ingredients must be observed if an oil-soluble commercially useful resin or uniform, homogeneous character and low acid number is to be obtained, which proportions the prior art, so far as known to me, does not disclose. Extensive experimentation has convinced me that no satisfactory resin suitable for coating compositions can be made by replacing the phthalic acid with the polybasic fatty acid, as by reacting, according to known procedures, glycerol, an acid obtainable by the hydrolysis of an oil or fat, and a dibasic fatty acid of the kind above mentioned. I have found, for example, that the condensation of a mixture of glycerol, linoleic acid, and maleic, malic, tartaric or succinic acid, cannot be made to yield a homogeneous, resinous mass of low acid number. Thus I have established that when glycerol, linoleic acid and maleic acid are condensed in the proportions that would yield an oil-soluble resin in the case of phthalic acid, two separate layers are formed which cannot be made to mix and produce a homogeneous resin even with vigorous stirring and heating to high temperatures. No matter what quantity of glycerol or linoleic acid is employed, within the reasonable limits embraced in my investigations and required for oil-solubility, no mixing of the two layers can be effected; there is always produced a heavier lower layer which appears to be largely the glycerol ester of the dibasic acid, and a lighter upper layer comprising at least in part the glycerol ester of linoleic acid, the nature of these esters depending, of course, upon the quantity of glycerol present and the temperature at which the reaction has been carried out. When maleic acid is employed, heating of the mass to about 230-250° causes the lower layer to become infusible. With malic, tartaric, and succinic acids, the lower layer remains plastic for a long time at the elevated temperatures but the two layers never coalesce to yield a homogeneous mass. I have observed that the dibasic aliphatic acid usually becomes esterified first, the linoleic acid requiring a higher temperature for esterification. Part of the glycerol combines with the dibasic acid and part sometimes with the linoleic, but no mixed esters appear to be formed in any appreciable quantity; at any rate, the two separate layers persist under all conditions and continued heating at high temperatures usually results in hardening and charring of the lower layer.

The following processes, among others, were carried out by me in the attempt to secure a homogeneous oil-soluble commercial resin of low acid number by reacting glycerol with a dibasic aliphatic acid and with an acid derived by hydrolysis from a drying oil. All resulted in failure.

Example A 1 mol glycerol
1 mol maleic acid
1 mol linoleic acid were heated at elevated temperatures to produce condensation. Two layers formed, the heavier being a glycerol maleate while the lighter layer comprised esterified linoleic acid having an acid number of about 9. These layers persisted in spite of stirring. After heating for a short time at about 200° C. the lower layer jelled and began to char when heated further.

*Example B.*—The amount of glycerol was then increased, the following proportions being employed:

2 mols glycerol
1 mol maleic acid
1 mol linoleic acid

The same results were obtained as described under Example A. At no time was a uniform homogeneous resinous material obtained having any commercial value for coating compositions.

The amount of linoleic acid was then increased as follows:

Example C 2 mols glycerol
1 mol maleic acid
2 mols linoleic acid

The results obtained were similar to those indicated under Example A.

A large excess of glycerol was then employed, the following formula being used:

Example D 4 mols glycerol
1 mol maleic acid
1 mol linoleic acid

In general, the results were similar to those given under Example A. A higher temperature could be reached in the lower layer and a temperature of 230° C. could be maintained for two hours before infusibility set in. The two separate layers, however, persisted and ultimately the lower layer jelled and began to char.

With other dibasic aliphatic acids, such as succinic, the results were quite similar to the above, two separate layers forming and persisting up to the point at which the lower layer was converted into an infusible mass or began to char. The following examples illustrate the use of dibasic aliphatic acids other than maleic acid.

Example E 2 mols of glycerol
1 mol malic acid
1 mol linoleic acid were heated to 230° C. Two distinct layers developed which could not be made to form a homogeneous mass despite very violent stirring. Finally the lower layer, which appeared to be a glycerol ester of malic acid, became semi-solid, the upper layer consisting essentially of the ester of linoleic acid and having an acid number of 15.

Example F 2 mols glycerol
1 mol succinic acid
1 mol linoleic acid gave substantially the same results as the formula given in Example E. Two separate layers were formed and could not be made to fuse together and react.

Example G 2 mols glycerol
1 mol tartaric acid
1 mol linoleic acid were heated, but no homogeneous resin could be obtained as two separate layers appeared which persisted even at 230° C. The lower layer, which consisted primarily of the ester of tartaric acid, finally darkened and condensed to a hard mass.

Example H 2 mols glycerol
1 mol tartaric acid
0.4 mol maleic acid
1 mol linoleic acid were heated to 230° C. Two layers developed and remained separate. The lower layer condensed rapidly and quickly became infusible, the maleic acid apparently hastening the conversion of the lower layer to the infusible state. As indicated in Examples E, F, and G, where the dibasic acid consists of malic, succinic or tartaric acid, the lower layer becomes infusible only after prolonged heating.

I have found, however, that a mixture of a polyhydric alcohol, such as glycerol, phthalic acid, maleic acid and one or more acids included in the group consisting of fatty acids obtainable by hydrolysis of a fatty oil or fat, can under certain conditions be made to yield valuable resinous materials which are highly suited for the manufacture of coating compositions, but only within more or less limited proportions of maleic acid. The use of an excess of maleic acid in relation to the amount of phthalic acid present will lead to the production of immiscible materials at least part of which will be converted to an infusible resin which chars on further heating, especially when it is attempted to continue the reaction to reduce the acid number of the resinous product to about 25 or below.

It is accordingly an object of the present invention to produce homogeneous oil soluble resins of low acid number, say 25 or below, containing maleic acid in chemical combination with a polyhydric alcohol, phthalic acid, and a high molecular weight fatty acid, which resins can be used in clear solutions as varnishes, or pigmented to produce enamels or paints, and particularly white coating compositions.

It is also an object of the invention to produce homogeneous, soluble, fusible resins of low acid number having a maximum content of maleic acid, and being free of any such quantity of uncombined basic hydroxyl groups as would tend to impair the drying qualities of the resin.

More specifically it is an object of the invention to produce a homogeneous oil soluble resin of an acid number below about 25 and composed of glycerol, phthalic acid, maleic acid, and an acid derived from a fatty oil or fat, the resin being free of the common oil solubilizers such as rosin or its glycerol ester.

It is a further object of the invention to produce plastic and semi-plastic fusible, soluble resins, which are more or less compatible or miscible, according to their particular composition, with drying and non-drying oils, resin varnishes, natural and synthetic varnish resins, and free fatty oil acids, and which are excellent vehicles, when brought into solution, for air drying and baking enamels, paints and varnishes, and particularly for white enamels. It is also an object of the invention to provide synthetic resins suitable for use in the manufacture of coating compositions which are highly durable, do not darken materially over indefinite periods, and adhere tenaciously to metallic and other surfaces.

The resins produced according to the present invention are soluble in coal tar solvents such as benzol, toluol, and solvent naphtha; in petroleum distillates, such as mineral spirits; in acetone, alcohol and in commercial mixtures of these solvents; and they are miscible with drying and non-drying oils, resin varnishes, natural and synthetic resins, including ester gums, to varying degrees, depending upon their specific constitution, and when incorporated with any suitable or known pigment yield enamels or paints of any desired color, including a dead white. The resins can be made practically neutral, the acid number being reducible to about 2 or 3, and thus can be mixed with basic pigments. Certain of the resins produced in accordance with the invention, and particularly those low in the fatty oil or fat acid, can be mixed with nitro-cellulose lacquers to produce coating compositions having the advantageous properties of both materials. My improved resins can also be mixed with phenol-formaldehyde resins containing a natural resin or a glycerol ester of a natural resin, i. e., an ester gum.

In accordance with the present invention, the mixture of glycerol, phthalic acid, maleic acid and the fatty oil or fat acid may be heated rapidly to 180° C. and then generally more slowly to about 230° C. When the latter temperature is reached the mass in most cases is clear and uniform, there being no division into separate layers. At this point the mass becomes soluble in toluol, but the acid number may still be quite high. The heating at 230° C. may be continued for about two hours or longer, depending upon the mass of reacting material, to effect further condensation of the resin and produce a sufficiently low acid number, say 25 or below, assuming, of course, that proper proportions of ingredients have been selected. During the reaction the mass is preferably stirred by a current of inert gas or mechanically. In general the proportions of the reacting ingredients are so selected, and particularly the amount of maleic acid, that the condensate may be heated for a sufficiently long time at elevated temperatures to induce further condensation and cause reduction of the acid number to about 25 or below without danger of rendering the mass infusible.

My invention will be more specifically described with the aid of the following examples which illustrate several satisfactory procedures for carrying out the invention. In these examples, column (A) represents the formula employed according to the invention, while column (B) indicates the results obtained with the same formula except that the maleic acid is replaced with an equimolecular quantity of phthalic acid, so that the molecular relationship between fatty oil acid, dibasic acid and glycerol remains the same. In each case the temperature was raised gradually to about 240° C., the mass being stirred to insure uniformity of temperature and to facilitate removal of volatile material. The proportions of the reacting materials are approximately the theoretical amounts required to produce a neutral product, the glycerol being, however, generally used, in slight excess to allow for impurities and for losses during the heating.

*Example 1*

|  | (A) | (B) |
|---|---|---|
| Soya bean oil fatty acids. | 1.5 mols. (420 grs.) | 1.5 mols. (420 grs.). |
| Phthalic anhydride | 1 mol. (148 grs.) | 1.2 mols. (178 grs.). |
| Maleic acid | 0.2 mol. (23 grs.) |  |
| Glycerol | 1.4 mols. (129 grs.) | 1.4 mols. (129 grs.). |
| Duration of heating at 240° C. | 20 hours | 40 hours. |
| Acid No. | 8 | 8. |
| Viscosity in (1:1) varnoline solution. | Tube T (Gardner-Holdt scale). | Less than tube A. After 60 hours practically no change in viscosity. |

In this example the maleic acid is 15.5% by weight of the phthalic anhydride. The material is a plastic, soluble in all common varnish solvents and the solutions are miscible with varnishes and resin solutions, thus producing coatings suitable for varnishes, enamels and paints, air drying as well as baking, preferably employed with a drier. The product is soluble in the solvents mentioned above and also in solvent acetates (butyl, amyl, etc.).

It will be noted that the process according to the invention is completed and produces a resin of satisfactory viscosity in a fraction of the time required by a process in which no maleic acid is used. In the absence of maleic acid, even heating for a very long time, both in this example and in the examples following, failed to yield a product having a practical or commercially satisfactory consistency.

*Example 2*

|  | (A) | (B) |
|---|---|---|
| Soya bean oil fatty acids. | 2 mols. (560 grs.) | 2 mols. (560 grs.). |
| Phthalic anhydride | 1 mol. (148 grs.) | 1.3 mols. (192 grs.). |
| Maleic acid | 0.3 mol. (35 grs.) |  |
| Glycerol | 1.6 mols. (147 grs.) | 1.6 mols. (147 grs.) |
| Duration of heating at 240° C. | 25 hours | 75 hours. |
| Acid No. | 10.5 | 10. |
| Viscosity in (1:1) varnoline solution. | Tube E (Gardner-Holdt scale). | Lighter than tube A. |

The maleic acid in this example is about 24% by weight of the phthalic anhydride. The material is a soft plastic, soluble in all common varnish solvents and is compatible with other varnishes and resin solutions.

*Example 3*

|  | (A) | (B) |
|---|---|---|
| Soya bean oil fatty acid. | 2 mols. (560 grs.) | 2 mols. (560 grs.). |
| Phthalic anhydride | 0.4 mol. (59 grs.) | 0.8 mol. (118 grs.). |
| Maleic acid | 0.4 mol. (46 grs.) |  |
| Glycerol | 1.3 mols. (120 grs.) | 1.3 mols. (120 grs.) |
| Duration of heating at 240° C. | 25 hours | 75 hours. |
| Acid No. | 10 | 10. |
| Viscosity | Heavier than tube T (Gardner-Holdt scale). | Tube O. |

In this example the maleic acid is 80% by weight of the phthalic anhydride. The viscosity was determined on the plastics as such. The viscosity of product (B), after 75 hours' heating, was only about ⅛ that of product (A) after 25 hours heating.

The resin is a soft plastic, soluble in all common varnish solvents and compatible with other varnish resins and varnishes such as ester gum varnishes.

Example 4

Like Examples 1, 2, or 3, with the exception that the soya bean oil fatty acid is substituted in whole or in part by the acids of linseed oil, perilla oil, wood oil, poppyseed oil, cottonseed oil, olive oil, castor oil, sunflower oil, corn oil, sesame oil, rapeseed oil, rubberseed oil, fish oil, or other oil and fat acids. Products similar to those according to Examples 1, 2 and 3 are obtained, their properties being slightly modified by the character of the fatty oil acid used. Thus the acids of drying oils will yield products having better drying qualities than will the acids of non-drying oils and of fats and are generally preferred.

The products obtained according to the invention are soluble to various degrees in linseed oil, wood oil, and other oils and the mixtures may be thinned with turpentine.

It will be seen from the above examples that the maximum proportion of maleic acid to phthalic acid or anhydride is approximately equimolecular. I have found that considerably larger quantities of maleic acid with reference to phthalic acid cannot safely be used even if the relative quantities of glycerol and fatty oil acid are changed, e. g. increased.

The maleic acid can, of course, be replaced with its anhydride, while in place of glycerol, other polyhydric alcohols, preferably those containing at least three hydroxyl groups, may be used.

The various oils, fatty acids, natural resins and ester gums, phenolic and other synthetic resins, and varnishes mentioned hereinabove may be mixed with my improved resin when the latter is in the finished state, or they may be added to the initial materials or at any stage in the reaction. Where the resin is to be mixed with China-wood oil, it is of advantage to add such oil at the beginning of the reaction as it becomes gas-proof during the process.

The term "fatty triglyceride" as employed in the claims is intended to embrace the oily and fatty materials consisting at least for the major part of the glycerides of high molecular weight fatty acids and including the drying, semi-drying and non-drying oils and the fats.

The present application is a continuation in part of my copending applications Ser. No. 506,298, filed January 2, 1931, and Ser. No. 664,336, filed April 4, 1933.

I claim:

1. The method of producing a homogeneous, fusible, oil soluble resin which comprises reacting simultaneously glycerol, phthalic acid, maleic acid in a substantial amount up to approximately 1 mol for every mol of phthalic acid, and an amount of acids obtained on hydrolysis of a fatty triglyceride sufficient to make the product oil-soluble.

2. The method of producing a homogeneous, fusible, oil soluble resin which comprises reacting simultaneously glycerol, phthalic acid, maleic acid in a substantial amount up to approximately 1 mol for every mol of phthalic acid, and an amount of soya bean oil acids sufficient to make the product oil-soluble.

3. The method as set forth in claim 1, wherein the proportions of the reacting materials are approximately as follows: glycerol, 1.4 to 3.25 mols; phthalic acid, 1 mol; maleic acid, 0.2 to 1 mol; acids of a fatty triglyceride, 1.5 to 5 mols.

4. The method of producing a homogeneous, fusible, oil soluble resin which comprises heating simultaneously approximately 1.4 mols of glycerol, 1 mol of phthalic acid, 0.2 mol maleic acid, and 1.5 mols drying oil acid, to approximately 240° C., and continuing the reaction at such temperature until a product having an acid number of about 8 and a viscosity of tube T on the Gardner-Holdt scale is obtained.

5. The method of producing a homogeneous, oil fusible, soluble resin which comprises reacting simultaneously approximately 1.6 mols of glycerol, 1 mol of phthalic acid, 0.3 mol maleic acid, and 2 mols soya bean oil acids by heating the mixture slowly to about 240° C., and maintaining the latter temperature until a substantially neutral resin of the desired viscosity is obtained.

6. The method according to claim 1, wherein China-wood oil is added to the reacting materials at the beginning of the reaction.

ISRAEL ROSENBLUM.